United States Patent
Cogley (10) Patent No.: US 10,021,869 B1
(45) Date of Patent: Jul. 17, 2018

(54) MOSQUITO DESTRUCTOR SYSTEM

(71) Applicant: Thomas Paul Cogley, Pinellas Park, FL (US)

(72) Inventor: Thomas Paul Cogley, Pinellas Park, FL (US)

( * ) Notice: Subject to any disclaimer, the term of this patent is extended or adjusted under 35 U.S.C. 154(b) by 25 days.

(21) Appl. No.: 15/146,550

(22) Filed: May 4, 2016

Related U.S. Application Data (63) Continuation-in-part of application No. 14/996,857, filed on Jan. 15, 2016, which is a continuation-in-part of application No. 14/731,884, filed on Jun. 5, 2015.

(Continued)

(51) Int. Cl.
| | |
|---|---|
| *A01M 1/22* | (2006.01) |
| *A01M 1/02* | (2006.01) |
| *A01M 1/04* | (2006.01) |
| *A01M 1/06* | (2006.01) |
| *A01M 1/14* | (2006.01) |
| *A01M 5/00* | (2006.01) |
| *A01M 5/02* | (2006.01) |

(Continued)

(52) U.S. Cl.
CPC ............ *A01M 1/223* (2013.01); *A01M 1/023* (2013.01); *A01M 1/026* (2013.01); *A01M 1/04* (2013.01); *A01M 1/06* (2013.01); *A01M 1/08* (2013.01); *A01M 1/145* (2013.01); *A01M 1/2016* (2013.01); *A01M 5/00* (2013.01); *A01M 5/02* (2013.01); *A01M 5/04* (2013.01); *A01M 2200/012* (2013.01)

(58) Field of Classification Search
CPC ............ A01M 5/04; A01M 5/06; A01M 5/08; A01M 1/04; A01M 1/06; A01M 1/08; A01M 1/14; A01M 1/22; A01M 1/223; A01M 1/00; A01M 1/02; A01M 1/023; A01M 1/10; A01M 5/00; A01M 5/02
USPC .................. 43/139, 140, 112–114, 107, 138
See application file for complete search history.

(56) References Cited

U.S. PATENT DOCUMENTS

| | | | | |
|---|---|---|---|---|
| 3,318,075 A | * | 5/1967 | Wilson ...................... | A47L 7/04 137/540 |
| 4,037,351 A | * | 7/1977 | Springer ................. | A01M 1/02 43/112 |

(Continued)

FOREIGN PATENT DOCUMENTS

| | | | | |
|---|---|---|---|---|
| FR | 2890287 A1 | * | 3/2007 | .............. A01M 5/08 |
| JP | WO-2015145789 A1 | * | 10/2015 | ............ A01M 1/023 |
| WO | WO-9713408 A1 | * | 4/1997 | .............. A01M 5/08 |

OTHER PUBLICATIONS

Davis, Kim "Making a Vacuum Cleaner Cover" Jul. 18, 2005 < http://www.thriftyfun.com/tf30915507.tip.html>.*

*Primary Examiner* — Darren W Ark
*Assistant Examiner* — Morgan T Barlow (57) ABSTRACT

A moving assembly has a base with a base bottom, a side wall, a rectangular conduit formed in the base bottom, and a fan with a motor mounted on the base bottom, and a collector box for collecting mosquitos. The fan functions to create a vacuum for drawing in mosquitos. A killing assembly has an upper dish and a lower dish. The upper dish has electrically charged wires. A pool in the lower dish constitutes a container for standing water. Air tubes are laterally spaced and vertically oriented. The air tubes have upper ends disposed above the pool to draw in mosquitos entering the vicinity of the upper ends and lower ends received in the rectangular conduit.

11 Claims, 7 Drawing Sheets

Related U.S. Application Data (60) Provisional application No. 62/304,418, filed on Mar. 7, 2016.

(51) Int. Cl.
*A01M 5/04* (2006.01)
*A01M 1/08* (2006.01)
*A01M 1/20* (2006.01)

(56) References Cited

U.S. PATENT DOCUMENTS

| | | | | |
|---|---|---|---|---|
| 4,157,629 A * | 6/1979 | Parks | | A01M 1/04 43/113 |
| 4,694,604 A * | 9/1987 | Mitchell | | A01M 1/02 43/107 |
| 4,843,752 A * | 7/1989 | Munemasa | | A01M 17/00 43/138 |
| 4,904,464 A * | 2/1990 | Albanese | | A01N 25/04 424/45 |
| 4,914,854 A * | 4/1990 | Zhou | | A01M 1/103 43/112 |
| 4,968,487 A * | 11/1990 | Yamamoto | | A01M 1/04 210/504 |
| 5,040,326 A * | 8/1991 | Van Dijnsen | | A01M 23/02 43/139 |
| 5,095,648 A * | 3/1992 | Keenan | | A01M 1/02 43/133 |
| 5,115,765 A * | 5/1992 | El Omary | | A01K 13/002 119/606 |
| 5,123,201 A * | 6/1992 | Reiter | | A01M 1/026 43/107 |
| 5,241,779 A * | 9/1993 | Lee | | A01M 1/02 43/112 |
| 5,255,469 A * | 10/1993 | Sukup | | A01M 5/08 43/140 |
| 5,400,543 A * | 3/1995 | Ideker, Jr. | | A01M 1/06 134/21 |
| 5,657,576 A * | 8/1997 | Nicosia | | A01M 1/023 43/107 |
| 6,050,025 A * | 4/2000 | Wilbanks | | A01M 1/023 43/112 |
| 6,055,766 A * | 5/2000 | Nolen | | A01M 1/023 43/112 |
| 6,134,826 A * | 10/2000 | Mah | | A01M 1/04 43/112 |
| 6,286,249 B1 * | 9/2001 | Miller | | A01M 1/02 43/113 |
| 6,305,122 B1 * | 10/2001 | Iwao | | A01M 1/023 43/112 |
| 6,459,955 B1 * | 10/2002 | Bartsch | | A47L 9/00 318/568.11 |
| 6,568,123 B2 * | 5/2003 | Nelson | | A01M 1/023 43/107 |
| 6,568,124 B1 * | 5/2003 | Wilbanks | | A01M 1/023 43/112 |
| 6,594,944 B2 * | 7/2003 | Chura | | A01M 1/10 43/112 |
| 6,618,984 B1 * | 9/2003 | Li | | A01M 1/04 43/107 |
| 6,665,979 B1 * | 12/2003 | Hsu | | A01M 1/223 43/107 |
| 6,675,528 B2 * | 1/2004 | Jablin | | A01M 1/02 43/107 |
| 6,883,201 B2 * | 4/2005 | Jones | | A47L 5/30 15/319 |
| 7,073,287 B2 * | 7/2006 | Lau | | A01M 1/02 43/107 |
| 7,234,268 B2 * | 6/2007 | Welch | | A01M 1/02 43/112 |
| 7,348,890 B2 * | 3/2008 | Barber | | A01M 1/026 340/539.26 |
| 7,441,298 B2 * | 10/2008 | Svendsen | | A47L 5/30 15/319 |
| 7,441,367 B2 * | 10/2008 | Squire | | A01M 1/02 43/132.1 |
| 8,109,036 B1 * | 2/2012 | Wilbanks | | A01M 1/023 43/112 |
| 9,010,017 B2 * | 4/2015 | Southard | | A01M 3/005 43/132.1 |
| 9,693,547 B1 * | 7/2017 | Moitier | | A01M 5/02 |
| 9,807,996 B1 * | 11/2017 | Yu | | A01M 5/02 |
| 2001/0047231 A1 * | 11/2001 | Peless | | A01D 34/008 701/23 |
| 2003/0051391 A1 * | 3/2003 | Jablin | | A01M 1/02 43/139 |
| 2003/0060928 A1 * | 3/2003 | Abramson | | F04D 29/30 700/245 |
| 2003/0074832 A1 * | 4/2003 | Snell | | A01M 1/2005 43/124 |
| 2003/0208951 A1 * | 11/2003 | Bossler | | A01M 1/02 43/107 |
| 2004/0123512 A1 * | 7/2004 | Spiro | | A01M 1/023 43/139 |
| 2004/0128902 A1 * | 7/2004 | Kollars, Jr. | | A01M 1/023 43/107 |
| 2004/0128904 A1 * | 7/2004 | Chen | | A01M 1/023 43/139 |
| 2004/0160199 A1 * | 8/2004 | Morgan | | A01M 1/04 315/312 |
| 2004/0181997 A1 * | 9/2004 | Lee | | A01M 1/08 43/139 |
| 2004/0200130 A1 * | 10/2004 | Klein | | A01M 1/14 43/114 |
| 2004/0216367 A1 * | 11/2004 | Klein | | A01M 1/02 43/114 |
| 2004/0237382 A1 * | 12/2004 | Durand | | A01M 1/023 43/139 |
| 2005/0011110 A1 * | 1/2005 | Lin | | A01M 1/023 43/122 |
| 2005/0019361 A1 * | 1/2005 | Durand | | A01M 1/02 424/405 |
| 2005/0060926 A1 * | 3/2005 | Lee | | A01M 1/08 43/113 |
| 2005/0066570 A1 * | 3/2005 | Mosher, II | | A01M 1/02 43/139 |
| 2005/0274061 A1 * | 12/2005 | Zhu | | A01M 1/02 43/139 |
| 2006/0042155 A1 * | 3/2006 | Nolen | | A01M 1/023 43/112 |
| 2006/0080887 A1 * | 4/2006 | Chen | | A01M 1/08 43/113 |
| 2006/0086037 A1 * | 4/2006 | Roberts | | A01M 1/02 43/107 |
| 2006/0242888 A1 * | 11/2006 | Bedoukian | | A01M 1/06 43/107 |
| 2006/0254124 A1 * | 11/2006 | DeYoreo | | A01M 1/023 43/139 |
| 2006/0260183 A1 * | 11/2006 | Hockaday | | A01M 1/02 43/129 |
| 2007/0011940 A1 * | 1/2007 | Chen | | A01M 1/02 43/113 |
| 2007/0074447 A1 * | 4/2007 | Kalogroulis | | A01M 1/023 43/107 |
| 2007/0157508 A1 * | 7/2007 | Chang | | A01M 1/023 43/139 |
| 2008/0035640 A1 * | 2/2008 | Weber | | B65F 1/16 220/213 |
| 2008/0086932 A1 * | 4/2008 | Cook | | A01M 1/02 43/114 |
| 2008/0148624 A1 * | 6/2008 | Borth | | G01N 33/68 43/131 |
| 2008/0168701 A1 * | 7/2008 | Hu | | A01M 1/04 43/107 |
| 2009/0313881 A1 * | 12/2009 | Troutman | | A01K 13/002 43/107 |
| 2010/0145417 A1 * | 6/2010 | Kaufmann | | A01M 1/2094 607/91 |

(56) References Cited

U.S. PATENT DOCUMENTS

| | | | | |
|---|---|---|---|---|
| 2010/0186285 A1* | 7/2010 | Schmitt | A01M 1/06 | 43/132.1 |
| 2010/0205767 A1* | 8/2010 | Lewis | A01M 3/005 | 15/339 |
| 2011/0154719 A1* | 6/2011 | Carroll | A01M 5/06 | 43/136 |
| 2011/0283597 A1* | 11/2011 | Coventry | A01M 1/023 | 43/107 |
| 2011/0311603 A1* | 12/2011 | Lucas | A01N 25/34 | 424/411 |
| 2012/0137569 A1* | 6/2012 | Younts | A01M 3/005 | 43/139 |
| 2012/0246998 A1* | 10/2012 | Vasudeva | A01M 1/023 | 43/114 |
| 2013/0014429 A1* | 1/2013 | Meskouris | A01M 1/2094 | 43/139 |
| 2013/0025183 A1* | 1/2013 | Durand | A01M 1/02 | 43/107 |
| 2013/0101654 A1* | 4/2013 | Mathis | A01N 59/00 | 424/405 |
| 2013/0326933 A1* | 12/2013 | Jung | A01M 1/04 | 43/140 |
| 2014/0013655 A1* | 1/2014 | Southard | A01M 3/005 | 43/139 |
| 2014/0084774 A1* | 3/2014 | Phillips | A01M 1/2011 | 312/352 |
| 2014/0130930 A1* | 5/2014 | Ragner | F16L 11/118 | 138/121 |
| 2014/0137462 A1* | 5/2014 | Rocha | A01M 1/08 | 43/113 |
| 2014/0165452 A1* | 6/2014 | Rocha | A01M 1/08 | 43/113 |
| 2014/0168412 A1* | 6/2014 | Shulman | H04N 7/18 | 348/89 |
| 2014/0190071 A1* | 7/2014 | Mistretta | A01M 1/223 | 43/112 |
| 2015/0052799 A1* | 2/2015 | Bernhardt | A01M 1/106 | 43/107 |
| 2015/0082687 A1* | 3/2015 | Neff | A01M 1/12 | 43/111 |
| 2015/0125504 A1* | 5/2015 | Ward | D01D 5/0985 | 424/411 |
| 2015/0264913 A1* | 9/2015 | Ganmor | A01M 5/08 | 43/139 |
| 2015/0305320 A1* | 10/2015 | Hedman | A01M 1/24 | 43/132.1 |
| 2016/0066556 A1* | 3/2016 | Banfield | A01M 1/106 | 43/113 |
| 2016/0157496 A1* | 6/2016 | Nchekwube | A01N 25/006 | 424/84 |
| 2016/0183476 A1* | 6/2016 | Kabakov | A01G 7/06 | 239/159 |
| 2016/0262367 A1* | 9/2016 | Sandford | A01M 1/145 | |
| 2016/0377093 A1* | 12/2016 | Shigemoto | F04D 29/4226 | 415/121.2 |
| 2017/0079258 A1* | 3/2017 | Patel | A01N 63/02 | |
| 2017/0202199 A1* | 7/2017 | Patel | A01M 1/023 | |
| 2017/0231210 A1* | 8/2017 | Lillamand | A01M 1/06 | 43/107 |
| 2018/0027796 A1* | 2/2018 | Tugel | A01M 1/08 | |

* cited by examiner

MOSQUITO DESTRUCTOR SYSTEM

RELATED APPLICATION

This application is based upon and claims the benefit of Provisional Application No. 62/304,418 filed Mar. 7, 2016, the subject matter of which applications is incorporated herein by reference.

BACKGROUND OF THE INVENTION

Field of the Invention

The present invention relates to a mosquito destructor system and more particularly pertains to attracting mosquitos, for killing attracted mosquitos, and for ambulating to maximize mosquitos attracted and killed, the attracting and killing and ambulating being done in a safe, ecological, convenient, and economical manner. The present invention is effective in attracting and killing a wide variety of mosquitos including those carrying the Zika virus.

Description of the Prior Art

The use of mosquito killing systems of known designs and configurations is known in the prior art. More specifically, mosquito killing systems of known designs and configurations previously devised and utilized for the purpose of killing mosquitos are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a mosquito destructor system that allows attracting and killing mosquitos and ambulating to maximize mosquitos attracted and killed, the attracting and killing and ambulating being done in a safe, ecological, convenient, and economical manner.

In this respect, the mosquito destructor system according to the present invention substantially departs from the conventional concepts and designs of the prior art, and in doing so provides an apparatus primarily developed for the purpose of attracting and killing mosquitos and for ambulating to maximize mosquitos attracted and killed, the attracting and killing and ambulating being done in a safe, ecological, convenient, and economical manner.

Therefore, it can be appreciated that there exists a continuing need for a new and improved mosquito destructor system which can be used for attracting and killing mosquitos and for ambulating to maximize mosquitos attracted and killed, the attracting and killing and ambulating being done in a safe, ecological, convenient, and economical manner. In this regard, the present invention substantially fulfills this need.

SUMMARY OF THE INVENTION

In view of the foregoing disadvantages inherent in the known types of mosquito killing systems of known designs and configurations now present in the prior art, the present invention provides an improved mosquito destructor system. As such, the general purpose of the present invention, which will be described subsequently in greater detail, is to provide a new and improved mosquito destructor system and method which has all the advantages of the prior art and none of the disadvantages.

To attain this, from a broad viewpoint, the present invention is a mosquito destructor system. A moving assembly has a base with a base bottom, a side wall, and a fan with a fan motor. The fan is mounted on the base bottom. The fan functions to create a vacuum for drawing in mosquitos. A killing assembly has an upper dish and a lower dish. The upper dish has electrically charged wires. A pool in the lower dish constitutes a container for standing water. A collector box in the moving assembly collects mosquitos drawn in by the fan and the pool. Air tubes are laterally spaced and vertically oriented. The air tubes have upper and lower ends. A rectangular conduit is formed in the base bottom for receiving the lower ends of the air tubes. The upper ends of the air tubes are disposed above the pool to draw in mosquitos entering the vicinity of the upper end of the air tubes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mosquito destructor system which has all of the advantages of the prior art insect eliminating devices and none of the disadvantages.

It is another object of the present invention to provide a new and improved mosquito destructor system which may be easily and efficiently manufactured and marketed and set upon the vast majority of robotic vacuums with minimum modifications to such robotic vacuums.

It is a further object of the present invention to provide a new and improved mosquito destructor system which is of durable and reliable constructions.

An even further object of the present invention is to provide a new and improved mosquito destructor system which is susceptible of a low cost of manufacture with regard to both materials and labor, and which accordingly is then susceptible of low prices of sale to the consuming public, thereby making such mosquito destructor system economical manner available to the buying public.

Lastly, another object of the present invention is to provide a mosquito destructor system for attracting mosquitos, for killing attracted mosquitos, and for ambulating to maximize mosquitos attracted and killed, the attracting and killing and ambulating being done in a safe, ecological, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
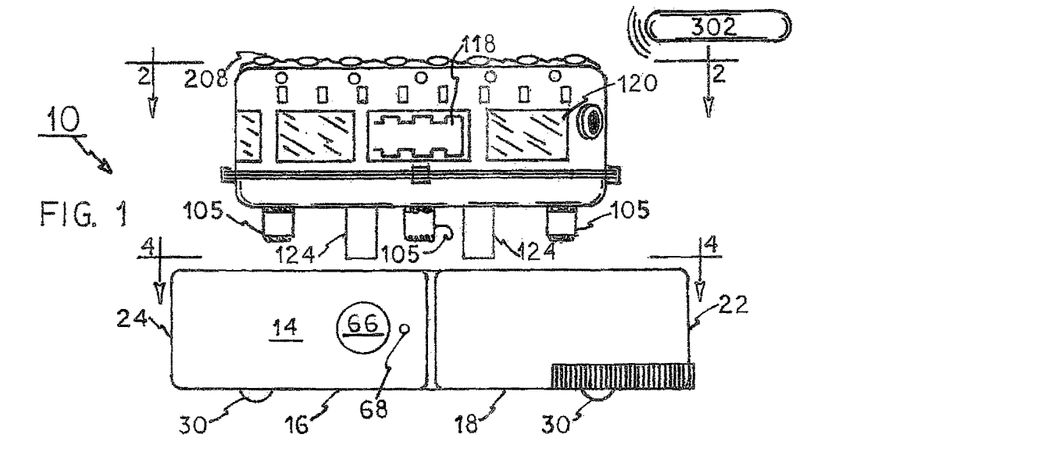
FIG. 1 is an exploded right side elevational view of a mosquito destructor system constructed in accordance with the principles of the present invention.
Figure 2:
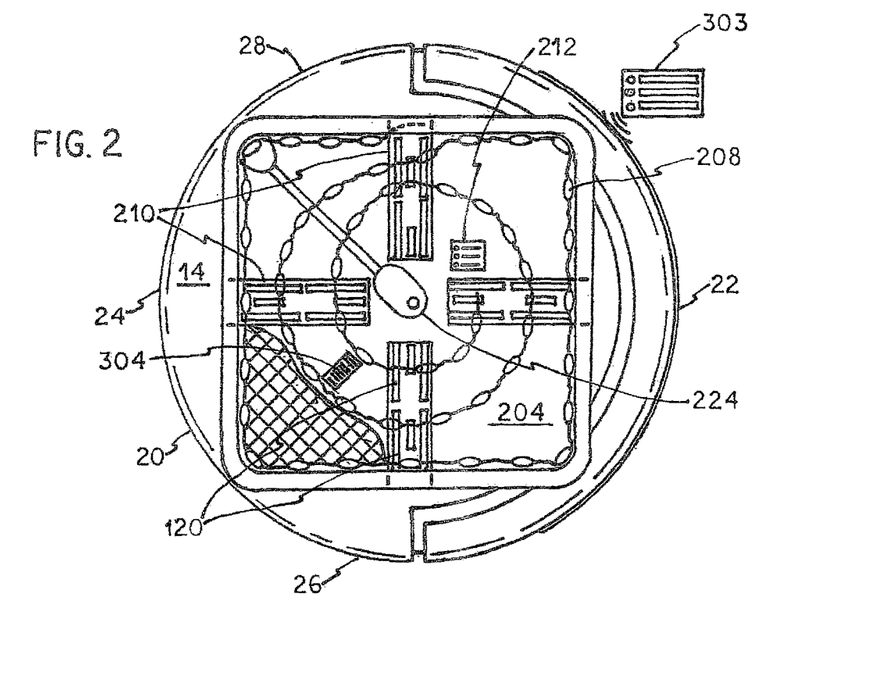
FIG. 2 is a plan view of the system taken along line 2-2 of FIG. 1.
Figures 3, 4, 4A:
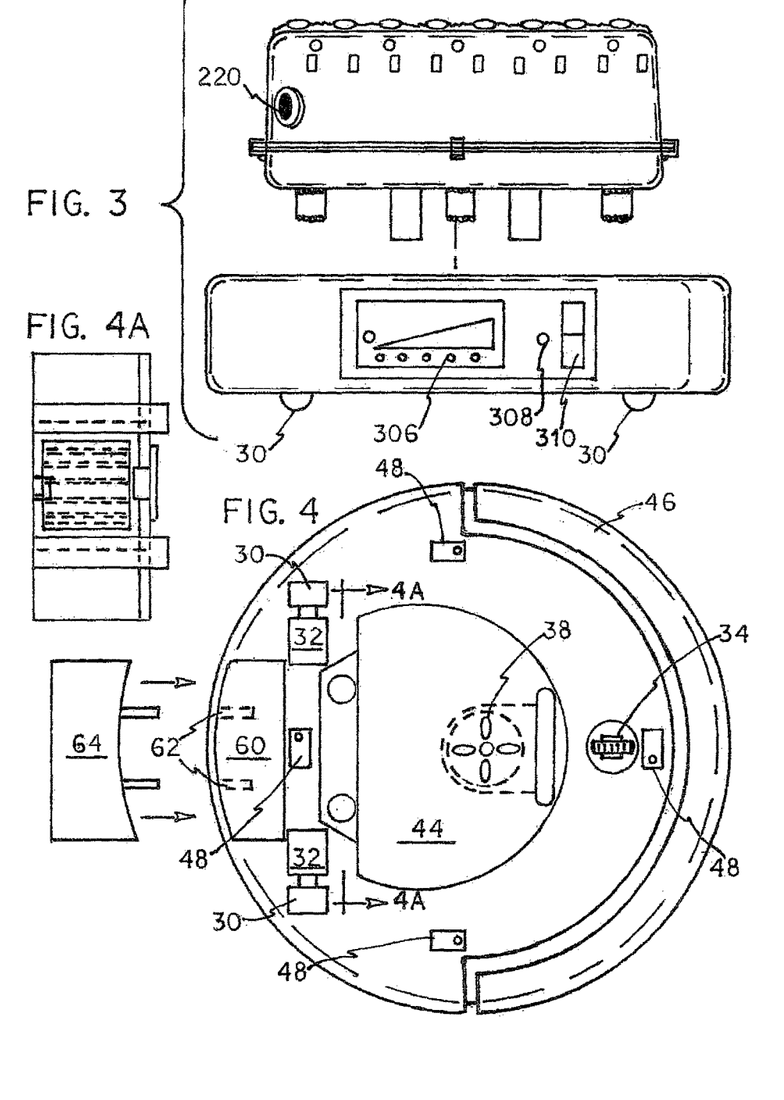
FIG. 3 is an exploded left side elevational view of the system shown in FIG. 1.
FIG. 4 is plan view of the moving assembly taken along line 4-4 of FIG. 1.
FIG. 4A is a cross sectional view taken along line 4A-4A of FIG. 4.
Figure 5:
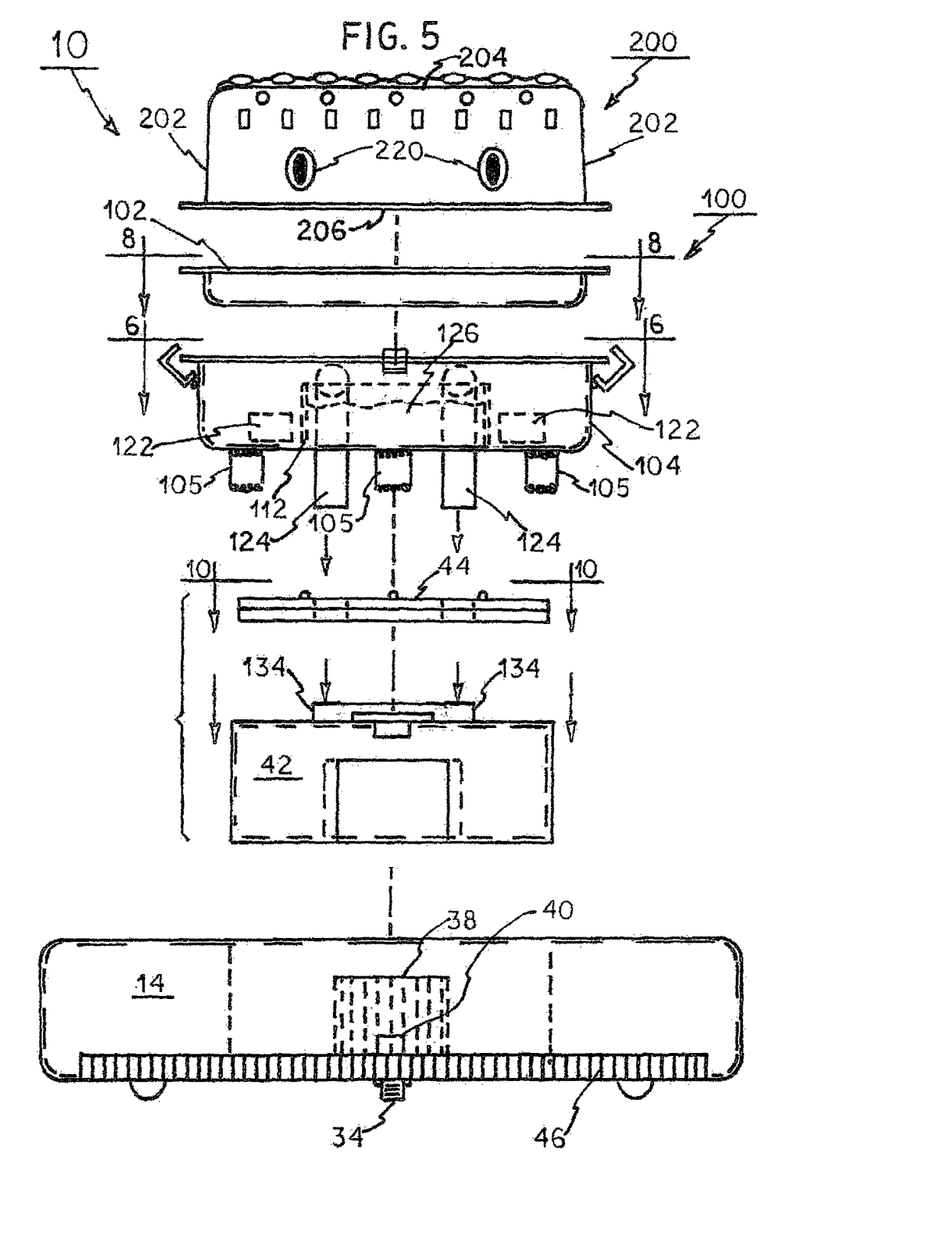
FIG. 5 is an exploded front elevational view of the system shown in FIGS. 1 and 4.
Figure 6:
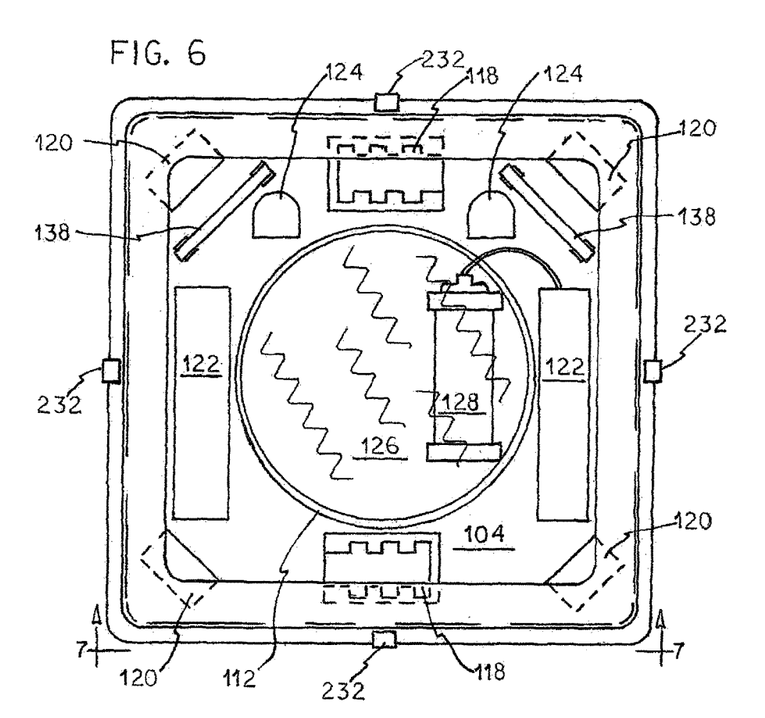
FIG. 6 is a plan view of the killing assembly taken along line 6-6 of FIG. 5.
Figure 7:
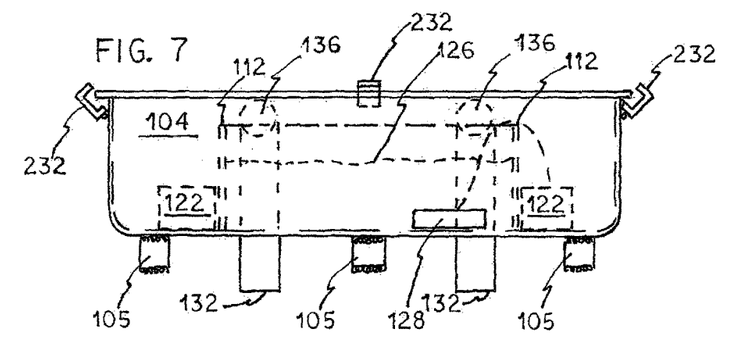
FIG. 7 is a side elevational view taken along line 7-7 of FIG. 6.
Figure 8:
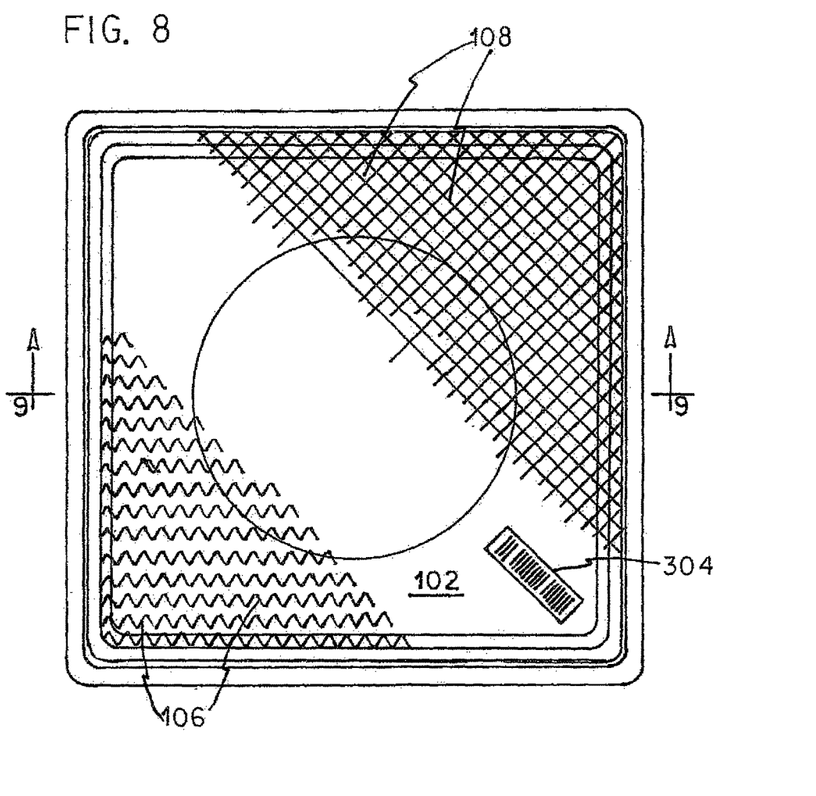
FIG. 8 is a plan view of the killing assembly taken along line 8-8 of FIG. 5.
Figure 9:
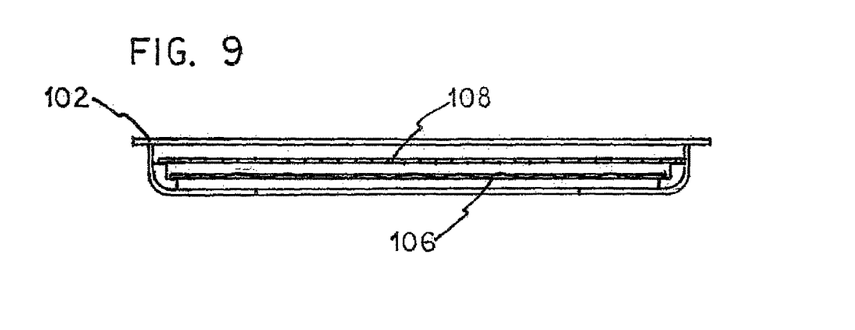
FIG. 9 is a cross sectional view taken along line 9-9 of FIG. 8.
Figure 10:
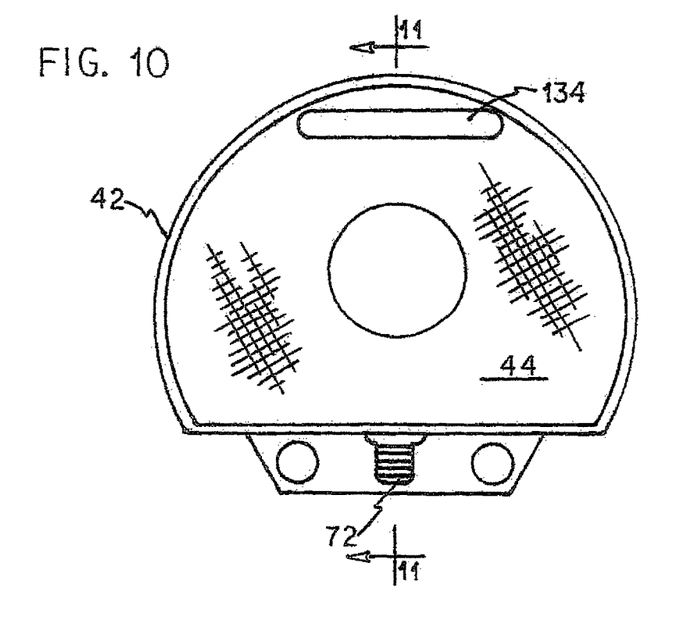
FIG. 10 is a plan view of the moving assembly taken along line 10-10 of FIG. 5 showing the filter and associated components.

With reference now to the drawings, and in particular to FIGS. 1, 3, and 5 thereof, the preferred embodiment of the new and improved mosquito destructor system embodying the principles and concepts of the present invention and generally designated by the reference numeral 10 will be described.

The present invention, the mosquito destructor system 10 is comprised of a plurality of components. Such components in their broadest context include an attracting assembly, a killing assembly, and a moving assembly. Such components are individually configured and correlated with respect to each other so as to attain the desired objective.

From a specific viewpoint the present invention is a mosquito destructor system 10 having a moving assembly 14, a killing assembly 100, an attracting assembly 200, and a control assembly, and a shroud 400.

First provided is the moving assembly 14. The moving assembly has a top. The moving assembly also has a base 16. The base has a circular base bottom 18 and a cylindrical side wall 20 forming a lower chamber. The base has a forward region 22, a rearward region 24, a left side region 26, and a right side region 28. A rectangular conduit (134) located within the base. The moving assembly includes two drive wheels 30. The drive wheels depend from the base bottom adjacent to the rearward region. The moving assembly includes two drive motors 32. The drive motors power the drive wheels respectively. The moving assembly includes a caster wheel 34. The caster wheel depends from the base bottom adjacent to the forward region. The caster wheel is pivotable about a vertical axis to change the direction of movement of the base and the system.

The moving assembly includes a squirrel cage central fan 38. The central fan has a central fan motor 40. The central fan is mounted centrally on the base bottom. The moving assembly includes a filter 44. The filter is impregnated with an insecticide. A handle 72 attached to the filter facilitates movement, replacement, and cleaning of the filter.

Figure 11:
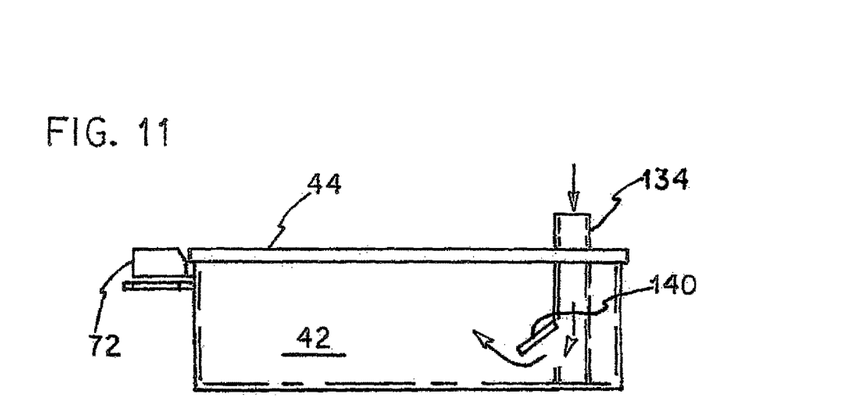
FIG. 11 is a side elevational view taken along line 11-11 of FIG. 10.

The squirrel cage central fan 38 functions to create a vacuum. The vacuum draws the mosquitos and debris into the collector box 42 for disposal. Arrows in FIG. 11 illustrate the direction of air flow.

The moving assembly includes a semi-circular bumper 46. The semi-circular bumper is recessed in the forward region. The semi-circular bumper extends to the left and right side regions. The semi-circular bumper is moved upon contact with a wall. In this manner rotation of the wheels is reversed. Further in this manner the direction of motion of the system is changed. The moving assembly includes a plurality of sensors 48. The sensors are mounted to the base bottom. In this manner the rotation of the wheels is reversed and the system tumbling down steps is abated.

The moving assembly has a battery pack 60 within the chamber with nodes 62 adjacent to the rearward region. The moving assembly includes a charger 64. The charger functions to receive the nodes and recharge the battery pack powering the wheels, sensors and central fan motor. The moving assembly includes a speaker 66. The speaker is positioned in the cylindrical side wall of the base to provide verbal messages. A button 68 is provided to power the speaker and initiate a verbal message.

The killing assembly 100 is next provided. The killing assembly includes an upper dish 102 and a lower dish 104. The upper dish has electrically charged wires 106. The killing assembly includes a pool 112 in the lower dish. The pool constitutes a container for standing water 126. The collector box collects the mosquitos and debris drawn in by the fan. The electrically charged wires function to kill mosquitos coming into contact with the electrically charged wires. The upper dish has a grid 108 of un-charged wires. The un-charged wires are spaced above the electrically charged wires. In this manner human contact with the electrically charged wires is abated. The killing assembly includes a plurality of heating elements 118 which are also in the lower dish and function to attract mosquitos. The lower dish includes adhesive sheets 120. Batteries 122 power the carbon dioxide generator 128 and the electrically charged wires.

Figure 12:
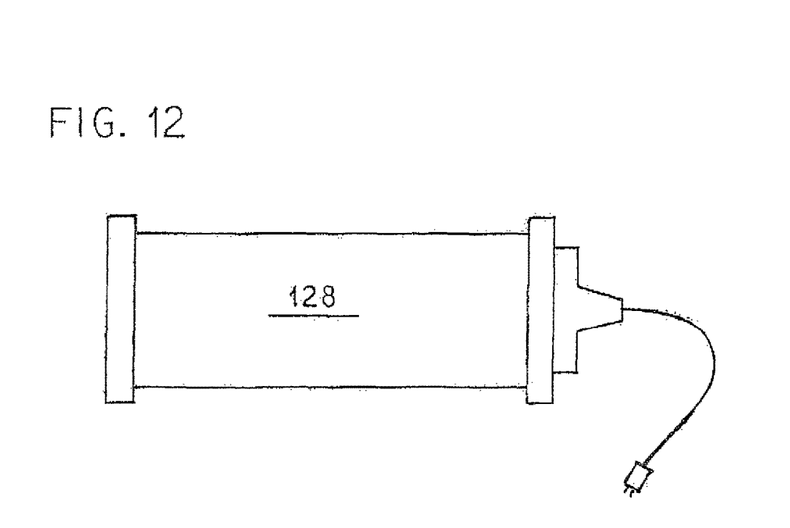
FIG. 12 is a front elevational view of the carbon dioxide generator to be positioned in the pool.

The major components of the killing assembly are the pool 112 and air tubes 124. The pool contains standing water 126, preferably thickened water. The water is a natural attractant and breeding ground for mosquitos. The attracting qualities of the water are enhanced by a carbon dioxide generator 128 which is immersed in the water. The carbon dioxide generator is illustrated as an electrical device. In the alternative, the carbon dioxide generator could be a pill dropped into the water in the pool. Although the pool is illustrated as circular, it could be any of a variety of other designs. One successful design substituting for the pool is a segment of bicycle tire about 2 to 6 inches long and with water about 0.75 to 1.25 inches deep.

The air tubes 124 are laterally spaced and vertically oriented. The air tubes have upper ends 136 and lower ends 132. A rectangular conduit 134 located within the base receives the lower ends of the air tubes. The upper ends of the air tubes are disposed above the pool to draw in mosquitos entering the vicinity of the upper end of the air tubes. Panels 138 soaked in pheromones render the vicinity of the upper ends of the air tubes more attractive to mosquitos. A flapper valve 140 in a lower section of the rectangular conduit is adapted to open when the fan is operating and creating an air flow. The flapper valve is adapted to close under the influence of gravity when the fan is not operating.

Next, the attracting assembly 200 is provided for attracting mosquitos to be killed. The attracting assembly has rectangular side walls 202, an open top 204, and a open bottom 206. The attracting assembly includes a string of light emitting diodes 208. The attracting assembly includes a plurality of supports 210 with clips retaining the light emitting diodes in a spiral configuration. The string of light emitting diodes has an exterior end coupled to the battery pack 122. The string of light emitting diodes has an interior end. The interior end has a user-operated control pad 212 communicating with a light remote 303 for controlling the light emitting diodes.

The attracting assembly includes peripheral components. The peripheral components are on the exterior surface of the attracting assembly. The peripheral components include heating elements 118, adhesive sheets 120, and indicia in the form of eye balls 220 creating the appearance of a creature. The eye balls are preferably formed of fluorescent material to attract mosquitos to be killed. A camera 224 is positioned over the pool to track the operation of the system.

Three legs 105 extend downwardly from the lower dish of the killing assembly. The legs have downwardly facing hook and loop fasteners. Three associated recesses in the top of the moving assembly have upwardly facing hook and loop fasteners. The downwardly extending legs 105 are adapted to be removably received in the recesses to allow for proper positioning and removable securement between the moving assembly and the killing assembly.

Next, a control assembly is provided. The control assembly includes a remote travel device 302 for providing a user control of the wheels. The control assembly also functions to drive the system along a wall or hit the bumper for dispensing diatomaceous earth. The control assembly also includes a user visible digital universal product code (UPC) 304. The control assembly includes a battery power percentage indicator 306. The battery power percentage indicator has an ON/OFF button 308 and a CLAP ON/CLAP OFF switch 310.

Figure 13:
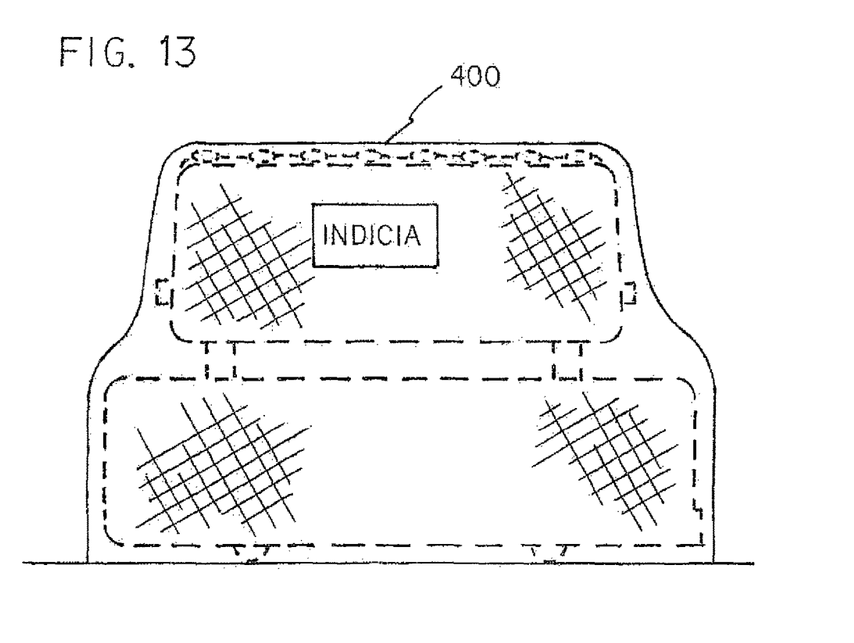
FIG. 13 is a front elevational view of the shroud for the system as above described.

Lastly, illustrated in FIG. 13, the shroud 400 is provided for covering the system when the system is not in use. The shroud is preferably impregnated with a natural insecticide.

As an alternate embodiment, four upper clips 232 are provided on the killing assembly for coupling the attracting assembly to the killing assembly. The killing assembly and the attracting assembly are adapted to be integrally fabricated as an upper sub-assembly removably coupled to the moving assembly as disclosed herein.

The killing assembly and the attracting assembly as a unit may removably fit upon many types of moving assemblies of various shapes and makes by a set of connectors thereby creating two independent power and working sub-systems. When using commercially available robotic vacuums, minimum changes will have to be made in order to render them suitable for use in the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mosquito destructor system comprising:
   a moving assembly; and
   a killing assembly;
   the moving assembly being entirely self-propelled and being entirely beneath the killing assembly, the moving assembly comprising:
      a base comprising:
         a base bottom and a side wall,
         a rectangular conduit located within the base,
         a fan motor,
         a fan mounted on the base bottom, adapted to create a vacuum for drawing in mosquitos, and
         a collector box for collecting mosquitos;
   the killing assembly comprising:
      an upper dish and
      a lower dish;
      electrically charged wires in the upper dish,
      a pool in the lower dish, the pool constituting a container for standing water,
      air tubes laterally spaced and vertically oriented, the air tubes having upper ends and lower ends,
         the lower ends of the air tubes received in the rectangular conduit,
         the upper ends of the air tubes being disposed above the pool to draw in mosquitos entering the vicinity of the upper ends of the air tubes.

2. The system as set forth in claim 1 and further comprising:
   a flapper valve in a lower section of the rectangular conduit adapted to open when the fan is operating for creating an air flow, the flapper valve adapted to close under the influence of gravity when the fan is not operating.

3. The system as set forth in claim 1 wherein:
the base has a forward region and a rearward region and a left side region and a right side region; and
the moving assembly comprises:
two drive wheels depending from the base bottom adjacent to the rearward region,
two drive motors powering the two drive wheels respectively,
a caster wheel depending from the base bottom adjacent to the forward region, the caster wheel being pivotable about a vertical axis to change a direction of movement of the system during use.

4. The system as set forth in claim 1 and further comprising:
an attracting assembly for attracting mosquitos to be killed, the attracting assembly comprising:
an exterior surface,
rectangular side walls,
an open top,
an open bottom,
a string of light emitting diodes,
a plurality of supports comprising clips retaining the light emitting diodes in a spiral configuration,
a battery pack, and
a light remote device,
the string of light emitting diodes comprising:
an exterior end coupled to the battery pack, and,
an interior end having a user-operated control pad communicating with the light remote device for controlling the light emitting diodes.

5. The system as set forth in claim 2 and further comprising:
peripheral components on the exterior surface of the attracting assembly, the peripheral components comprising:
heating elements,
adhesive sheets,
indicia in the form of eye balls creating the appearance of a creature, the eye balls comprising fluorescent material to attract mosquitos to be killed.

6. The system as set forth in claim 1 and further comprising:
a camera positioned over the pool to track the operation of the system.

7. The system as set forth in claim 1 and further comprising:
three downwardly extending legs comprising downwardly facing hook and loop fasteners; and
three associated recesses comprising upwardly facing hook and loop fasteners;
the downwardly extending legs adapted to be removably received in the recesses to allow for proper positioning and removable securement between the moving assembly and the killing assembly.

8. The system as set forth in claim 3 and further comprising:
a control assembly comprising
a remote travel device for providing a user with control of the drive wheels,
a user visible digital universal product code, and
a battery powered percentage indicator comprising:
an ON/OFF button, and
a sound actuated switch.

9. The system as set forth in claim 1 and further comprising a shroud for covering the system when the system is not in use, the shroud being impregnated with a natural insecticide.

10. A mosquito destructor system (10) for attracting and killing mosquitos, for ambulating to maximize mosquitos attracted and killed, the attracting and killing and ambulating being done in a safe, ecological, convenient, and economical manner, the system comprising, in combination:
a moving assembly (14),
a killing assembly (100),
an attracting assembly (200),
a control assembly; and
a shroud (400);
the moving assembly (14) being entirely self-propelled and being entirely beneath the killing assembly, the moving assembly comprising:
a top,
a base (16) comprising:
a circular base bottom (18) and
a cylindrical side wall (20) forming a lower chamber,
a forward region (22)
a rearward region (24)
a left side region (26)
a right side region (28) and
a rectangular conduit (134) located within the base,
two drive wheels (30) depending from the base bottom adjacent to the rearward region,
two drive motors (32) powering the two drive wheels respectively,
a caster wheel (34) depending from the base bottom adjacent to the forward region, the caster wheel being pivotable about a vertical axis to change the direction of movement of the system during use;
a squirrel cage central fan (38) comprising
a central fan motor (40), the central fan motor being mounted centrally on the base bottom,
a filter (44) impregnated with an insecticide,
a handle (72) attached to the filter to facilitate movement and replacement and cleaning of the filter,
the squirrel cage central fan functioning to create a vacuum for drawing in the mosquitos and debris into a collector box (42) for disposal;
a semi-circular bumper (46) recessed in the forward region, the semi-circular bumper extending to the left side region and the right side region, the semi-circular bumper being moved upon contact with a wall whereby rotation of the wheels is reversed and whereby the direction of motion of the system is changed,
a plurality of sensors (48) mounted to the base bottom to facilitate reversal of the drive wheels and reversal of the system to abate tumbling down steps,
a battery pack (60) within the lower chamber, the battery pack having nodes (62) adjacent to the rearward region,
a charger (64) functioning to receive the nodes and recharge the battery pack for powering the drive wheels and the sensors and the central fan motor,
a speaker (66) positioned in the cylindrical side wall of the base to provide verbal messages, and
a button (68) to power the speaker and initiate a verbal message;
the killing assembly (100) comprising:
an upper dish (102)
a lower dish (104) comprising adhesive sheets (120),
the upper dish comprising electrically charged wires (106), a pool (112) in the lower dish, the pool (112) constituting a container for standing water (126), the water being a natural attractant and breeding ground for mosquitos, a carbon dioxide generator (128) enhancing the attracting qualities of the water, the electrically charged wires functioning to kill mosquitos coming into contact with the electrically charged wires, a grid (108) of un-charged wires in the upper dish spaced above the electrically charged wires to abate human contact with the electrically charged wires, a plurality of heating elements (118) in the lower dish, the lower dish comprising adhesive sheets (120), batteries (122) powering the carbon dioxide generator and the electrically charged wires;

air tubes (124) laterally spaced and vertically oriented, the air tubes having upper ends (136) and lower ends (132), a rectangular conduit (134) located within the base receiving the lower ends of the air tubes, the upper ends of the air tubes being disposed above the pool to draw in mosquitos entering the vicinity of the upper end of the air tubes, panels (138) soaked in pheromones rendering the vicinity of the upper ends of the air tubes more attractive to mosquitos, a flapper valve (140) in a lower section of the rectangular conduit adapted to open when the fan is operating and creating an air flow, the flapper valve adapted to close under the influence of gravity when the fan is not operating;

the attracting assembly (200) for attracting mosquitos comprising:
an exterior surface,
rectangular side walls (202),
an open top (204),
an open bottom (206),
a string of light emitting diodes (208),
a plurality of supports (210) comprising clips retaining the light emitting diodes in a spiral configuration,
an exterior end (122) of the string of light emitting diodes coupled to the batteries,
an interior end of the string of light emitting diodes comprising a user-operated control pad (212)
a light remote device (303) for controlling the light emitting diodes; the user-operated control pad communicating with the light remote device;
peripheral components on the exterior surface of the attracting assembly comprising:
heating elements (118),
adhesive sheets (120),
indicia in the form of eye balls (220) creating the appearance of a creature, the eye balls comprising fluorescent material to attract mosquitos to be killed,
a camera (224) positioned over the pool to track the operation of the system;
the killing assembly having three legs (105) extending downwardly from the lower dish comprising downwardly facing hook and loop fasteners,
the moving assembly having three associated recesses in the top comprising upwardly facing hook and loop fasteners,
the legs adapted to be removably received in the recesses to allow for proper positioning and removable securement between the moving assembly and the killing assembly;
the control assembly comprising:
a remote travel device (302) for providing a user with control of the drive wheels, the control assembly also functioning to drive the system,
a user-visible digital universal product code (304),
a battery powered percentage indicator (306) comprising an ON/OFF button (308) and a sound activated switch (310); and
the shroud (400) adapted to cover the system when the system is not in use, the shroud being impregnated with a natural insecticide.

11. The system as set forth in claim 10 and further comprising four upper clips (232) on the killing assembly adapted to couple the attracting assembly to the killing assembly.

\* \* \* \* \*